United States Patent [19]

Abe

[11] 4,163,533
[45] Aug. 7, 1979

[54] TAPE CASSETTE
[75] Inventor: Akira Abe, Shiogama, Japan
[73] Assignee: Sony Corporation, Tokyo, Japan
[21] Appl. No.: 858,277
[22] Filed: Dec. 7, 1977
[30] Foreign Application Priority Data
Dec. 10, 1976 [JP] Japan ............................ 51-166471[U]
[51] Int. Cl.² ............................................. G11B 23/10
[52] U.S. Cl. ...................................................... 242/198
[58] Field of Search ........................ 242/198, 199, 200; 360/132, 96, 93

[56] References Cited
U.S. PATENT DOCUMENTS

| | | | |
|---|---|---|---|
| 3,672,603 | 6/1972 | Swain | 242/198 |
| 3,833,185 | 9/1974 | Talavera | 242/199 |
| 4,022,401 | 5/1977 | Kishi | 242/198 |

Primary Examiner—George F. Mautz
Attorney, Agent, or Firm—Lewis H. Eslinger; Alvin Sinderbrand

[57] ABSTRACT

A tape cassette having supply and take-up reels rotatably disposed in a housing and a supply of tape wound on the reels and extending between the latter is provided with a one-piece, molded-plastic braking member for each reel which is urged to an engaged position when the cassette is not in use by means of a spring of springs formed integrally with the braking member, and which is operative in such engaged position to securely hold the respective reel against rotation in the direction for unwinding the tape therefrom, while permitting substantially free rotation of the respective reel independently of the other in the direction for rewinding the tape on the reel.

3 Claims, 8 Drawing Figures

TAPE CASSETTE

BACKGROUND OF THE INVENTION

1. Field of the Invention

This invention relates generally to tape cassettes, and more particularly is directed to improvements in magnetic tape cassettes provided with reel brake assemblies which are engaged or operative when the cassette is not in use.

2. Description of the Prior Art

Recently, it has been proposed to provide an improved cassette recording and/or reproducing apparatus in which a magnetic tape extending between supply and take-up reels contained in a cassette housing may be withdrawn from the housing for the high quality recording and reproducing of information signals on the tape. Generally, the tape cassette provided for use in such an apparatus has a relatively large opening in the peripheral wall of the cassette housing to permit the magnetic tape to be withdrawn therethrough. Therefore, if the magnetic tape is loosened, as by turning of one or both of the reels in the direction for unwinding the tape therefrom while the cassette is not in use, there is the danger that the loosened tape may inadvertently exit from the housing through the large opening of the latter and thus be susceptible to being damaged or even severed. Even if the loosened tape does not exit from the cassette housing, it is possible that the loosened tape within the housing will not be positioned so as to make possible its controlled withdrawal from the cassette housing ehen the cassette is subsequently installed on an apparatus for the recording or reproducing of information on the respective tape.

Various tape cassettes have been proposed in which braking means are provided within the cassette housing to resist unwinding or loosening of the tape when the cassette is not in use. In a particularly advantageous tape cassette provided with braking means, as aforesaid, for example, as disclosed in detail in U.S. Pat. No. 4,022,401, issued May 10, 1977, and having a common assignee herewith, each reel rotatably disposed in the cassette housing is provided with a circular series of raked teeth which define respective substantially radially directed surfaces facing in the direction of rotation of such reel for unwinding of the tape therefrom, and the braking means for each reel includes a support member, preferably in the form of a pivoted lever, movable in the cassette housing between an engaged position and a disengaged position, a pawl-like member carried by the support member to be positioned against the raked teeth of the respective reel in the engaged position of the support and being spaced from the raked teeth in the disengaged position, and means mounting the pawl-like member for angular displacement in respect to the support member. When the support member is in its engaged position, rotation of the respective reel in the direction for rewinding the tape thereon causes the raked teeth to skip or move past the pawl-like member as the latter is angularly displaced in one direction relative to its support member so as to substantially free the reel for rotation in the tape rewinding direction, whereas rotation of the reel in the tape unwinding direction brings one of the substantially radially directed surfaces of the raked teeth against the pawl-like member so as to urge the latter to be angularly displaced in the opposite direction relative to its support member. Further, abutment means are preferably fixed in respect to the cassette housing and are engageable by the pawl-like member in the engaged position of its support member for blocking the angular displacement of the pawl-like member in said opposite direction relative to its support member, thereby to prevent unwinding of the tape from the associated reel. Further, in the existing tape cassette being described, a torsion spring of resilient wire of the like is formed separate from the remainder of the braking means and is assembled in respect to each pivoted support member so as to yieldably urge the latter to its engaged position, and the cassette housing has an opening at which a portion of the support member is accessible from the exterior of the housing for actuation of the pivoted support member or lever to its disengaged position against the force of the respective spring. Although it has been proposed, in connection with the tape cassette being described, to form each support member, the respective pawl-like member and the means by which the latter is mounted on the support member as integral parts of a one-piece molded-plastic element, it has been found that the production and assembly of the described braking means having an independent torsion or coil spring for urging each pivoted support member to its engaged position are relatively time consuming and costly.

OBJECTS AND SUMMARY OF THE INVENTION

Accordingly, it is an object of this invention to provide a tape cassette with improved braking means of the described character which can be produced and assembled relatively quickly and inexpensively.

Another object is to provide a tape cassette with braking means, as aforesaid, in which the number of individually formed parts for providing such braking means is substantially reduced so as to facilitate the assembly of the braking means and thereby reduce its cost.

In accordance with an aspect of this invention, a one-piece, molded-plastic braking member is provided for each reel rotatably disposed in the cassette housing, and each such braking member includes a support portion movable in the housing between an engaged position and a disengaged position, a pawl-like portion on a resilient extension of the support portion so as to be positioned against raked teeth of the respective reel in the engaged position of the support portion and being spaced from the teeth in the disengaged position of the support portion with the resilient extension permitting angular displacement of the pawl-like portion relative to the support portion so that, with the latter in its engaged position, the reel is substantially free to be rotated in the tape rewinding direction, whereas rotation of the respective reel in the tape unwinding direction is positively blocked, and spring means integral with the support portion and engageable against the cassette housing for yieldably urging the support portion to its engaged position. Such spring means as an integral part of the one-piece molded-plastic braking member may include one or more resilient arms extending from the support portion and each being engageable with the housing for urging the support portion to its engaged position.

The above, and other objects, features and advantages of the invention, will be apparent in the following detailed description of illustrative embodiments which

DESCRIPTION OF THE PREFERRED EMBODIMENTS

Figure 1:
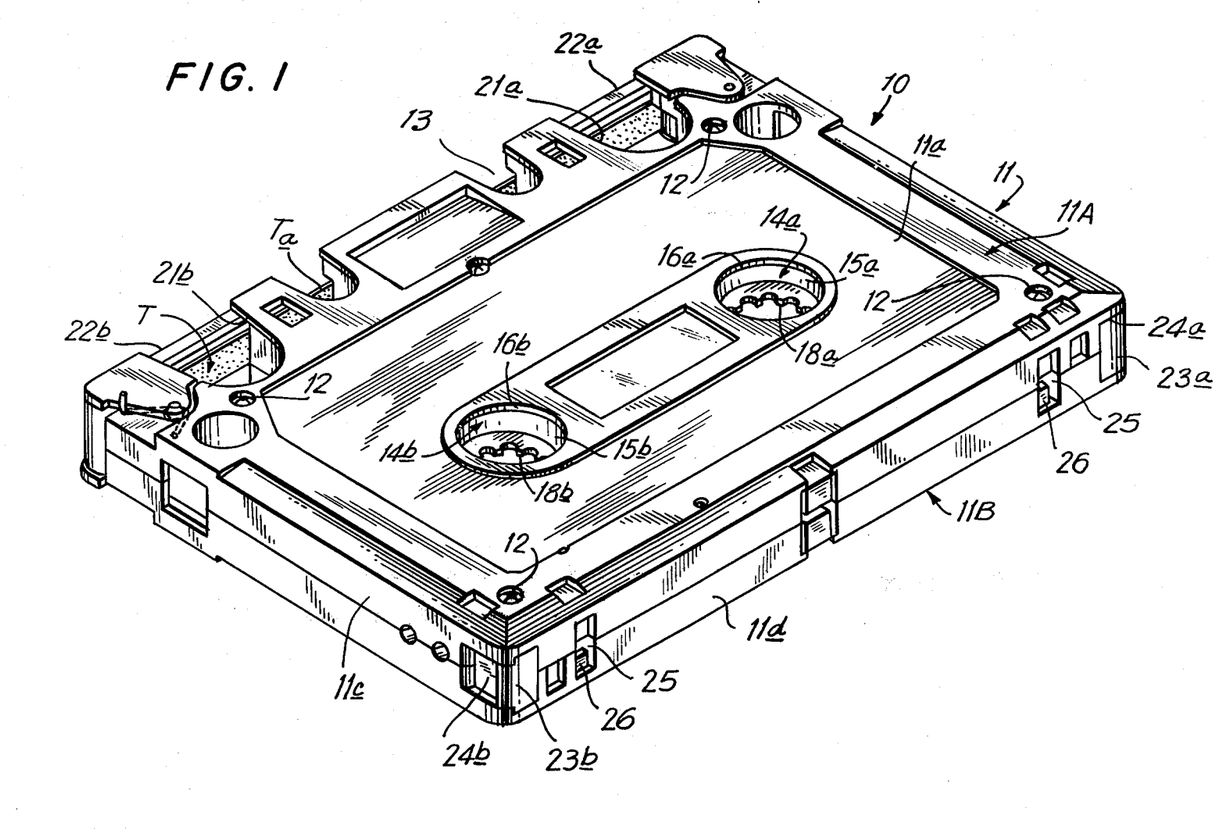
FIG. 1 is a perspective view of a tape cassette embodying this invention and being viewed from the back side thereof.
Figure 2:
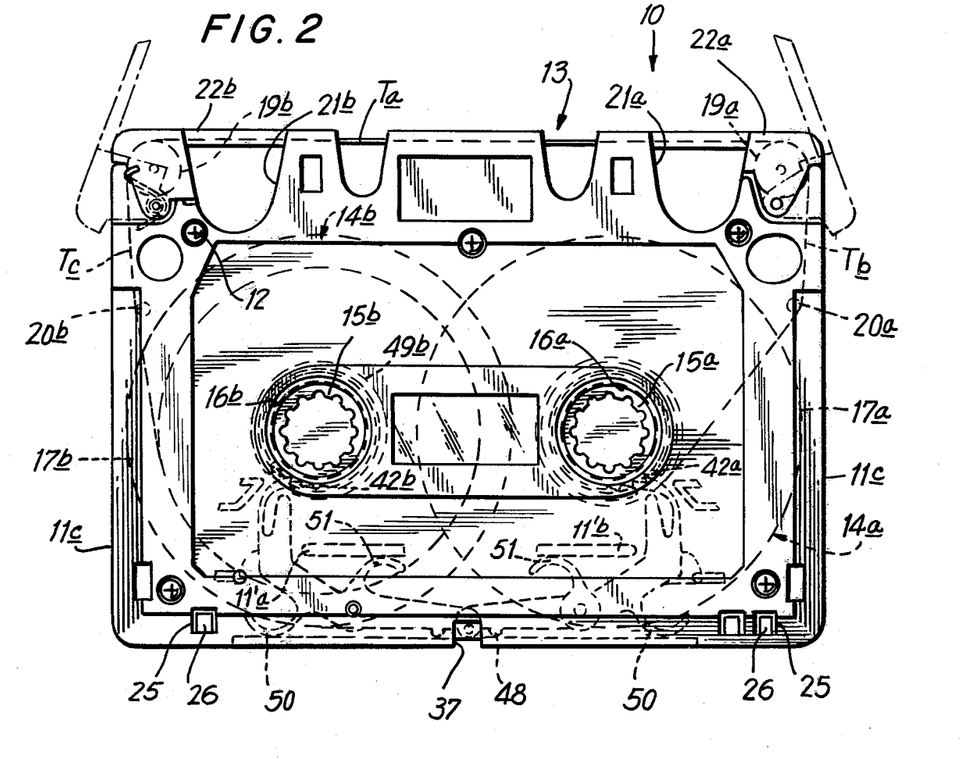
FIG. 2 is a top plan view of the tape cassette of FIG. 1.

Referring to the drawings in detail, and initially to FIGS. 1 and 2 thereof, it will be seen that a tape cassette 10 according to an embodiment of this invention generally comprises a substantially rectangular cassette housing 11 formed of mating, molded plastic upper and lower sections 11A and 11B which are suitably secured together, for example, by screws 12. The housing sections 11A and 11B are respectively constituted by top and bottom walls 11a and 11b having peripheral flanges extending along one of the relatively long sides and both of the relatively short sides of rectangular housing 11 for defining peripheral walls, specifically, side walls 11c and a back wall 11d. Since the peripheral walls extend along only three of the sides of rectangular housing 11, an opening 13 is defined between top and bottom walls 11a and 11b along the fourth relatively long side of the housing.

A supply of tape T is contained in housing 11 and is wound on supply and take-up reels 14a and 14b. As shown, supply reel 14a may include a cylindrical hub 15a which, at its upper and lower ends, is loosely and rotatably guided in circular holes 16a provided in the top and bottom walls of housing 11, and an upper flange 17a extending radially outward from hub 15a under top wall 11a of the housing. The inner surface of hub 15a is formed with a plurality of circumferentially spaced apart, projections or splines 18a for rotatable coupling of supply reel 14a with a respective reel drive shaft or spindle (not shown) of a tape recording and/or reproducing apparatus. The take-up reel 14b may similarly include a cylindrical hub 15b which, at its upper and lower ends, is loosely and rotatably guided in circular holes 16b in the top and bottom walls of housing 11, and a lower flange 17b extending radially outward from hub 15b above bottom wall 11a. The inner surface of hub 15b is also shown to be formed with a plurality of circumferentially spaced apart projections or splines 18b for rotatable coupling of take-up 14b with a respective reel drive shaft of spindle (not shown) of the tape recording and/or reproducing apparatus.

As shown in broken lines on FIG. 2, reels 14a and 14b are disposed in side-by-side relation with the upper flange 17a of reel 14a overlapping or overlying a portion of the lower flange 17b of reel 14b. Since reels 14a and 14b each have only a single flange 17a or 17b for guiding the tape T wound thereon, the upper surface of bottom wall 11b has a raised portion formed by a plurality of ribs 11b' (FIG. 3) at the region corresponding to supply reel 14a, and such raised portion is covered with a layer S of low friction material, such as, a sheet of polytetrafluoroethylene or the like, which acts as a low-friction guide for the lower edge of the tape T wound on supply reel 14a. Similarly, though not shown on the drawings, top wall 11a of the cassette housing has a downwardly thickened portion formed by a plurality of ribs at the region thereof corresponding to take-up reel 14b, and the undersurface of such thickened portion is covered by a layer of low friction material for guiding the upper edge of the tape wound on take-up reel 14b.

The cassette 10 is also shown to be provided with guide rollers 19a and 19b (FIGS. 2 and 3) which are rotatably mounted between top and bottom walls 11a and 11b at the corners of housing 11 disposed at the opposite ends of opening 13 for guiding tape T between reels 14a and 14b in a run $T_a$ extending along the fourth or open side of the cassette housing. Further, guide pins 20a and 20b project upwardly from bottom wall 11b adjacent the opposite, relatively short side walls 11c of the housing and engage the tape between reel 14a and guide roller 19a and between reel 14b and guide roller 19b, respectively. Thus, guide pins 20a and 20b direct the tape between reels 14a and 14b and the adjacent ends of run $T_a$ in paths $T_b$ and $T_c$ (FIG. 2) that are respectively adjacent the opposed relatively short side walls 11c of the housing.

As shown, top and bottom walls 11a and 11b may be provided with pairs of aligned, generally U-shaped cutouts 21a and 21b which communicate with opening 13 and which are symmetrically disposed adjacent the opposite ends of the respective long side of housing 11. Lid members 22a and 22b are mounted to pivot relative to housing 11 about respective pivot axes disposed adjacent the corners of rectangular housing 11 which are at opposite ends of the long open side of the housing. The pivoting axes of lid members 22a and 22b are perpendicular to the planes of top and bottom walls 11a and 11b for permitting swinging movements of the lid members in directions parallel to the planes of the top and bottom walls between closed and opened positions, as shown by solid and dot-dash lines, respectively, on FIG. 2. Lid members 22a and 22b are spring biased to their closed positions where they extend along at least part of the open long side of the housing for covering or projecting respective parts of the tape in run T. In their opened positions, lid members 22a and 22b are displaced from opening 13 for permitting the withdrawal of the tape through such opening by suitable tape withdrawing means (not shown) which initially extend into cutouts 21a and 21b. Preferably, as shown, lid members 22a and 22b are dimensioned to at least extend across cutouts 21a and 21b when the lid members are in their closed positions.

In order to avoid accidental erasing of recorded information signals on the magnetic tape, cassette housing 11 may be further provided with accidental erasing preventing members 23a and 23b (FIG. 1) which are slidably disposed in respective recesses 24a and 24b formed in the corners of housing 11 at the opposite ends of its back wall 11d. The members 23a and 23b are movable between first positions in which they substantially fill recesses 24a and 24b and are engageable by a detecting member (not shown) of a recording and/or reproducing apparatus to permit the establishment of the recording mode of operation of the latter, and second or depressed positions to which the detecting member responds by preventing the establishment of the recording mode of operation.

If desired, as shown on FIGS. 1 and 2, a plurality of holes 25 may be provided in back wall 11d adjacent the opposite ends thereof and in top and bottom walls 11a and 11b adjacent back wall 11d, with each of such holes 25 having a breakable tab 26 therein which can be selectively removed. The presence or absence of the tabs 26 may be detected by suitable detecting levers (not shown) of the recording and/or reproducing apparatus for automatically establishing the correct tape transporting speed and/or the correct equalization and bias current for the magnetic material of the tape T.

The tape cassetee 10 is provided with a brake assemby 30 (FIG. 4) which is engaged when the cassette is not in use, and which is operative in such engaged condition to securely hold the reels 14a and 14b against rotation in the directions for unwinding the tape therefrom, while permitting substantially free rotation of each of the reels independently of the other in the direction for rewinding the tape on the reel. In the illustrated embodiment of the invention, the brake assembly 30 is shown to comprise braking members 31a and 31b for the reels 14a and 14b, respectively. Each of the braking members 31a and 31b is of one-piece molded-plastic construction so as to be economically produced by having all of its parts formed integrally and simultaneously in a suitably mold.

Figure 4:
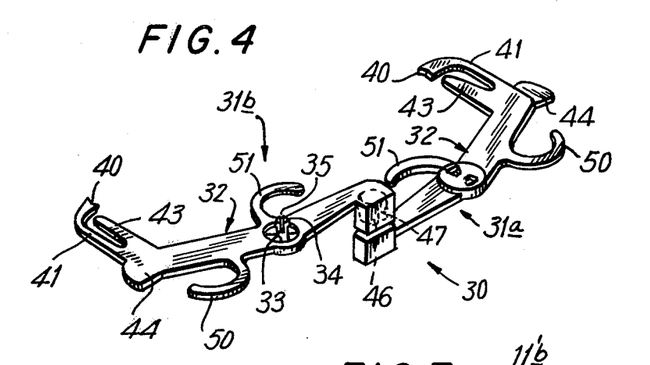
FIG. 4 is a perspective view of a pair of braking members provided in the tape cassette of FIG. 1.
Figure 6:
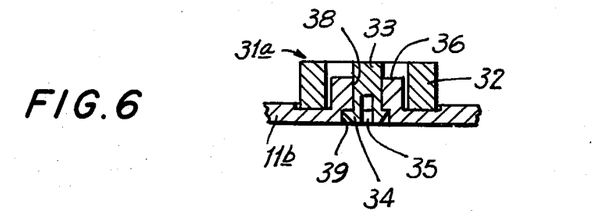
FIG. 6 is a fragmentary enlarged detail sectional view taken along the line VI—VI on FIG. 3.

Each of the braking members 31a and 31b is shown to include a support portion 32 in the form of an elongated lever provided, intermediate its ends, with a pivot stud 33 having an enlarged frusto-conical head 34 which a diametrical slot 35 (FIGS. 4 and 6). Bottom wall 11b of the cassette housing has a boss 36 (FIG. 6) extending upwardly therefrom adjacent back wall 11d to one side of an opening or window 37 at the center of the back wall, and such boss 36 has a bore 38 with an enlarged diameter lower end portion 39. In mounting braking member 31a in housing 11, the frusto-conical head 34 of stud 33 is pressed downwardly into bore 38 in boss 36 on bottom wall 11b. The diametrical slot 35 closes at least partially to permit the movement of head 34 through bore 38 until such head snaps into the enlarged diameter lower end portion 39 of the bore for pivotally securing support portion or lever 32 of braking member 31a bottom wall 11b. Similarly, top wall 11a of the cassette housing has a boss (not shown) identical in configuration to the boss 36 shown on FIG. 6, but depending from top wall 11a adjacent back wall 11d at the opposite side of opening 37 from the previously described boss 36. In mounting braking member 31b, the latter is arranged with its stud 33 directed upwardly, as shown on FIG. 4, and pressed into the boss of top wall 11a in the same manner as the stud 33 of braking member 31a has been described as being engaged with the boss 36 of bottom wall 11b. Thus, support portions or levers 32 of braking members 31a and 31b are respectively pivoted on axes that are laterally spaced apart adjacent back wall 11d of the cassette housing, and such levers 32 of braking members 31a and 31b extend substantially laterally within cassette housing 11 in back of reels 14a and 14b, respectively.

Each of the braking members 31a and 31b further includes a hook or pawl-like portion 40 which is mounted on the respective lever 32 by means of a flexibly resilient mounting portion 41 directed forwardly from the laterally outer end of the respective lever 32 and which may be in the form of a relatively thin web-like part. The hooks or pawl-like portions 40 of braking members 31a and 31b are respectively engageable with serrated gears 42a and 42b which are formed on the outer peripheries of the upper and lower end portions of hubs 15a and 15b, respectively, as shown in broken lines on FIG. 2. Each of the serrated gears 42a and 42b is constituted by a circular series of raked teeth which define respective substantially radially directed surfaces facing in the directions of rotation of the respective reel for unwinding the tape therefrom. Thus, in the case of the illustrated cassette 10, the substantially radially directed surfaces of the raked teeth of serrated gear 42a face in the counter-clockwise direction, that is, in the direction for unwinding the tape from reel 14a, while the substantially radially directed surfaces of the serrated gear 42b face in the clockwise direction which is the direction of rotation of the reel 14b for unwinding the tape therefrom.

Figure 5:
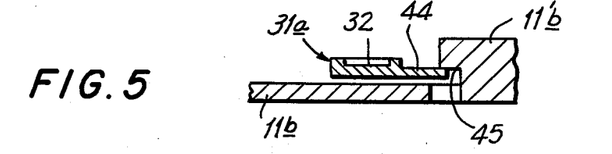
FIG. 5 is a fragmentary enlarged detail sectional view taken along the line V—V on FIG. 3.
Figure 7:
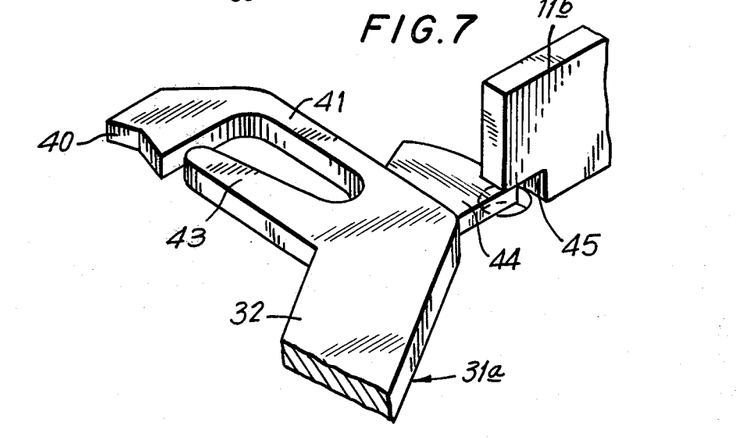
FIG. 7 is a fragmentary enlarged perspective view showing details of one of the braking members included in the braking assembly according to this invention.

Each of the braking members 31a and 31b is further shown to have a projection 43 directed forwardly from the laterally outer end of the respective lever or support portion 32, and being disposed inwardly with respect to the respective flexibly resilient mounting member 41. Each projection 43 is dimensioned so that the forward end thereof is normally spaced by a small distance from the rearwardly facing surface of the respective pawl-like portion 40. The laterally outer end of each lever or support portion 32 is further shown to be formed with a guiding nose portion 44 having a curved outer edge. When braking members 31a and 31b are pivotally mounted in respect to bottom wall 11b and top wall 11a, respectively, of cassette housing 11, as described above, the curved outer edges of the guiding nose portions 44 are slidably received in guide notches defined by undercut end portions of the previously mentioned ribs formed on the bottom wall 11b and at the underside of top wall 11a, respectively. Thus, for example, as shown on FIGS. 5 and 7, the curved outer edge of nose portion 44 on the lever 32 of braking member 31a is slidably guided in a notch or undercut 45 at an end of one of the ribs 11b' formed on bottom wall 11b of the cassette housing.

The laterally inner ends of levers 32 of braking members 31a and 31b are shown to be in adjacent, superposed relation and coupled together, for example, by a pin 46 directed upwardly from the inner end of the lever 32 of braking member 31a and being received in a downwardly opening recess 47 formed in the inner end portion of the lever 32 of braking member 31b. The coupled-together inner ends of levers 32 are shown to be exposed at the opening or window 37 located centrally in backwall 11d of the cassette housing. Further, the inner end portions of levers 32 are formed with rearwardly directed nodes 48 (FIGS. 2 and 3) engageable with back wall 11d for limiting the pivotal movements of the levers 32 in the directions toward their engaged positions.

Figure 3:
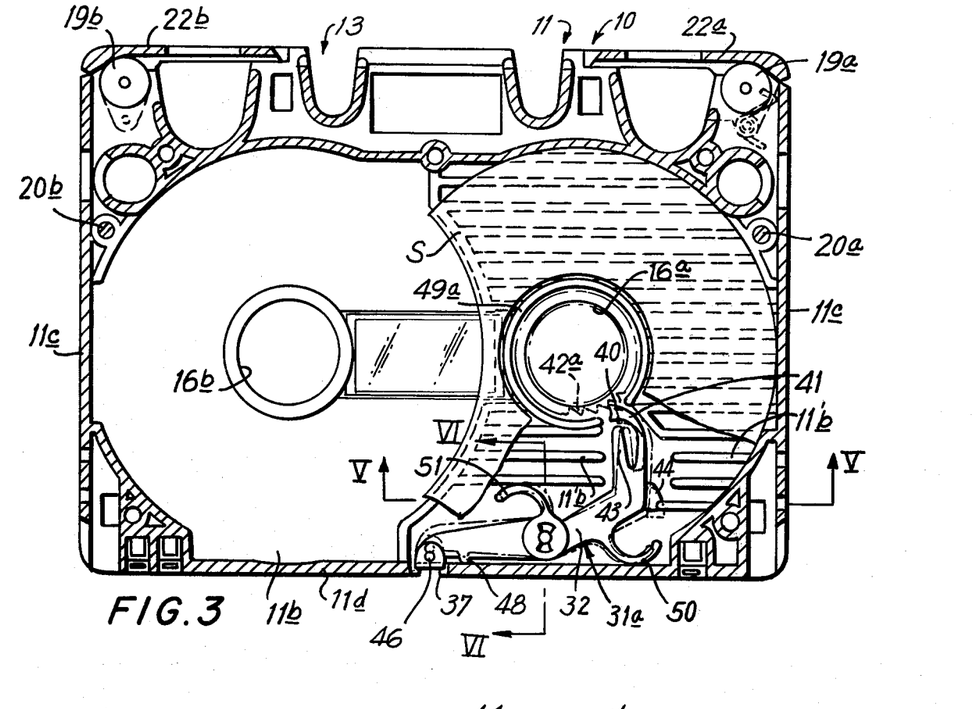
FIG. 3 is a top plan view similar to that of FIG. 2, but in which an upper section of the cassette housing and supply and take-up reels of the cassette are removed.

As shown particularly on FIG. 3, an annular flange 49a extends upwardly from bottom wall 11b of the cassette housing about the respective opening 16a in such bottom wall so as to extend around the series of raked teeth 42a on the lower end of the hub of reel 14a, and such flange 49a is formed with a gap through which the respective pawl-like portion 40 of braking member 31a is movable radially in respect to reel 14a into and out of engagement with the raked teeth 42a. Similarly, an annular flange 49b appearing in broken lines on FIG. 2 is directed downwardly from top wall 11a of the cassette housing about the respective opening 16b so as to extend around the series of raked teeth 42b on the hub of reel 14b, and such flange 49b is also formed with a gap through which the respective pawl-like portion 40 of braking member 31b is movable radially in respect to reel 14b into and out of engagement with the raked teeth 42b.

In accordance with the present invention, each of braking members 31a and 31b further includes spring means integral with the respective support portion or lever 32 for yieldably urging the latter to its engaged position shown in full lines on FIG. 3. As specifically shown on FIGS. 3 and 4, such spring means for each of the braking members 31a and 31b may be constituted by curved resilient arms 50 and 51 extending from the respective lever 32. The curved resilient arm 50 may extend from the respective lever 32 so as to bear rearwardly against back wall 11d of the cassette housing at a location that is disposed outwardly with respect to the pivoting axis of the respective lever 32. On the other hand, the curving resilient arm 51 may be directed forwardly from the respective lever 32 so as to bear forwardly against a corresponding abutment in the cassette housing 11 at a location spaced inwardly from the pivoting axes of the respective lever 32. In the case of the braking member 31a, the abutment for the resilient arm or spring 51 may be constituted by an adjacent one of the ribs 11b' extending upwardly from bottom wall 11b, as shown on FIG. 3, whereas, in the case of the braking member 31b, the abutment for the resilient arm or spring 51 thereof may be constituted similarly by a rib 11a' (shown in broken lines on FIG. 2) depending from top wall 11a of the cassette housing.

It will be apparent that the resilient arms or springs 50 and 51 formed as integral molded parts of each of the braking members 31a and 31b are effective to urge the respective lever 32 to its engaged position, that is, to pivot in the direction effecting forward displacement of the outer end portion of lever 32 and thereby moving the respective hook or pawl-like portion 40 into engagement with the raked teeth 42a or 42b.

The brake assembly 30 according to this invention operates as follows:

When the tape cassette 10 is not in use, levers 32 are relatively strongly urged by the resilient arms or springs 50 and 51 to their engaged positions in which nodes 48 abut against back wall 11d of the cassette housing and pawl-like portions 40 extend through the gaps in flanges 49a and 49b into engagement with raked teeth 42a and 42b, respectively, as shown on FIG. 2 and in full lines on FIG. 3. With levers 32 in their engaged positions, turning of hub 15a of supply reel 14a in its tape-unwinding direction, that is, in the counter-clockwise direction as viewed on FIG. 2, causes the substantially radially directed surface of one of the raked teeth 42a to act against the respective pawl-like portion 40 for causing angular displacement of the latter relative to the respective lever 32 in the clockwise direction. Although such clockwise angular displacement of pawl-like portion 40 of braking member 31a relative to the respective lever 32 is only slightly resisted by the respective resiliently flexible, thin web-like mounting portion 41, such angular displacement of the pawl-like portion 40 is severely restricted by its engagement with the adjacent edge of the gap in flange 49b. Thus, flange 49a acts as an abutment to block the angular displacement of pawl-like portion 40 relative to its lever 32 when the supply reel 14a is urged to rotate in the direction for unwinding the tape therefrom. Similarly, if hub 15b of the take-up reel 14b is turned in its tape-unwinding direction, the substantially radially directed surface of one of the respective raked teeth 42b acts against the pawl-like portion 40 of braking member 31b so as to urge such pawl-like portion to be angularly displaced relative to the respective lever 32 in the direction causing engagement against an adjacent edge of the gap in flange 49b. It will be apparent from the foregoing that, with levers 32 of braking members 31a and 31b in their engaged positions, reels 14a and 14b are positively locked against rotational movements in their respective tape-unwinding directions by the engagement of the pawl-like portions 40 against edges of the gaps in flanges 49a and 49b, respectively. The strength of such locking action is not dependent on the force of springs 50 and 51 which are merely relied upon for moving or urging levers 32 to their engaged positions.

When the tape cassette 10 according to this invention is installed or loaded in a recording and/or reproducing apparatus, a brake releasing member (not shown) of such apparatus is inserted in opening 37 in back wall 11d of the cassette housing so as to displace the coupled-together inner ends of levers 32 in the forward direction. Thus, levers 32 are pivoted against the force of springs 50 and 51 to their disengaged positions, for example, as shown in broken lines on FIG. 3 in respect to the lever 32 of braking member 31a, and in which pawl-like portions 40 of brake members 31a and 31b are withdrawn radially from engagement with the respective raked teeth 42a and 42b so as to free the take-up and supply reels for rotation without resistance from brake assembly 30.

When the tape cassette 10 is removed from the magnetic recording and/or reproducing apparatus, springs 50 and 51 are effective to return levers 32 to their engaged positions in which pawl-like portions 40 of the braking members 31a and 31b again engaged raked teeth 42a and 42b, respectively. If the tape wound on reels 14a and 14b is in a loosened condition when the tape cassette has been removed from the recording and/or reproducing apparatus, the brake assembly 30 according to this invention permits the substantially free rotation of such reels in the directions for rewinding the tape thereon even though levers 32 are then in their engaged positions. In this connection, it will be seen that with levers 32 being held in their engaged positions by integral springs 50 and 51, turning of the reel 14a or 14b in the directions for rewinding the tape thereon causes the raked or sloping surfaces of teeth 42a or 42b to move past the respective pawl-like portion 40. During such movement of the taked teeth 42a or 42b past the respective pawl-like portion 40, the latter is periodically angularly displaced with accompanying flexing of the respective thin, web-like part 41 which only lightly resists such angular displacement. Thus, although the springs 50 and 51 for urging levers 32 to their engaged positions may be relatively strong, such relatively strong spring force does not need to be overcome in turning reel 14a or 14b in the direction for rewinding the tape thereon with the result that the rewinding of the tape can be easily accomplished manually through the openings 16a and 16b in the cassette housing.

It will be apparent from the above that the brake assembly 30 according to this invention is effective, when the associated tape cassette 10 is not in use, to positively lock the take-up and supply reels against rotation in their respective tape-unwinding directions, while permitting substantially free rotation of the reels in the directions for rewinding the tape thereon. Further, although levers 32 are coupled together so as to be actuable to their disengaged positions by a single brake releasing member acting thereagainst in window 37, as described above, the coupling together of levers 32 does not interfere with the individual turning of one of the reels 14a and 14b in its tape-rewinding direction when the tape cassette is not in use.

Figure 8:
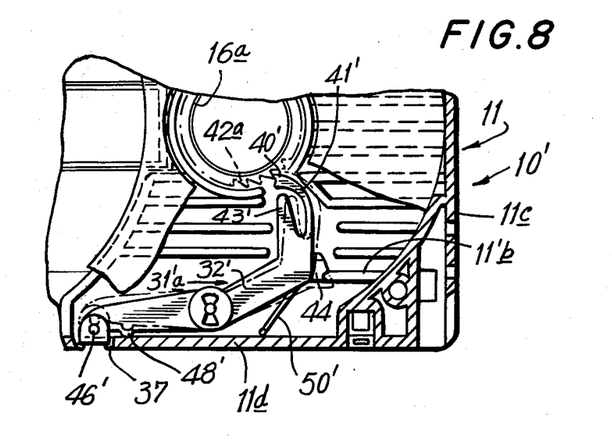
FIG. 8 is a fragmentary top plan view similar to a portion of FIG. 3, but showing a braking member in accordance with another embodiment of this invention.

In the embodiment of the invention as described above, and as particularly shown on FIGS. 3 and 4, each of the braking members 31a and 31b has the respective lever or support portion 32 urged to its engaged position by means of two resilient arms or springs 50 and 51 molded integrally with all of the other portions of the respective braking member. However, as shown particularly on FIG. 8, a braking member 31a' according to this invention, and which is otherwise similar to the previously described braking member 31a and has its various portions identified by the same reference numerals but with a prime appended thereto, may have a single resilient arm 50' extending integrally from support portion or lever 32' for engagement against the back wall 11d of cassette housing 11. The single resilient arm 50' preferably extends at an acute angle from lever 32' so as to occupy a relatively small space adjacent the lever 32'. It is also to be noted that the resilient arm 50' extends generally in the direction toward the pivoting axis of lever 32' from the point of attachment of resilient arm 50' to lever 32'. By reason of the foregoing arrangement, a relatively small bearing force of the free end of resilient arm 50' against back wall 11d is translated into a relatively large torque acting on lever 32' in the direction urging the latter to its engaged position. Although only a single braking member 31a' is shown on FIG. 8 for cooperation with one of the reels of tape cassette 10', it will be understood that a second similar braking member will be provided, in accordance with the invention, for cooperation with the other reel of the tape cassette.

Since each of the braking members 31a and 31b or 31a' in accordance with this invention has all of its portions, including the resilient arm or spring 50 and 51 or 50', molded integrally of a plastic material, such braking members can be conveniently and economically produced. Further, it will be appreciated that the braking members 31a and 31b or 31a', by reason of their unitary or one-piece construction, can be very quickly and easily installed in the cassette housing 11. The foregoing is to be distinguished from previously proposed similar braking assemblies in which springs and in some cases also pivots were produced and installed separately from the braking members themselves.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, as defined in the appended claims.

What is claimed is:

1. A tape cassette comprising: a housing; at least one reel rotatably disposed in said housing and having a circular series of raked teeth which define respective substantially radially directed surfaces facing in one of the directions of rotation of the reel; a supply of tape wound on said reel so as to be unwound from the latter upon rotation of the reel in said one direction and rewound on the reel upon rotation of the latter in the opposite direction; a one-piece molded-plastic braking member for each said reel including a support portion movable in said housing about a pivot means between an engaged position and a disengaged position; each said pivot means comprising a pivot stud extending from a surface of said support portion in a direction normal thereto, said pivot stud having an enlarged head with a diametrical slot therein, and a boss extending from said housing having a bore therein with an enlarged diameter end portion to receive said enlarged head of said pivot stud pressed therein, a pawl-like portion on a resilient extension of said support portion so as to be positioned against said raked teeth of the respective reel in said engaged position of the support portion and being spaced from said teeth in said disengaged position, said resilient extension permitting angular displacement of said pawl-like portion relative to said support portion so that, with the latter in said engaged position, rotation of said respective reel in said opposite direction for rewinding the tape thereon causes said raked teeth to move past said pawl-like portion as the latter is angularly displaced in one direction relative to the support portion to substantially free the reel for said rotation in said opposite direction thereof, whereas rotation of said respective reel in said one direction for unwinding the tape therefrom brings one of said surfaces of the raked teeth against said pawl-like portion so as to urge the latter to be angularly displaced in the opposite direction relative to said support portion, and spring means including a resilient arm integral at one end with said support portion and extending in a direction away from said support portion into engagement with said housing at a location substantially spaced from said pivot means for yieldably urging said support portion to said engaged position thereof; abutment means in said housing engageable by said pawl-like portion of the braking member in said engaged position of the support portion for blocking angular displacement of said pawl-like portion in said opposite direction relative to said support portion and thereby preventing unwinding of the tape from said reel; and said housing having an opening at which a portion of said support portion is accessible from the exterior of the housing for actuation of said support portion to said disengaged position against the force of said spring means.

2. A tape cassette according to claim 1; in which said resilient arm is arcuate in shape.

3. A tape cassette comprising: a housing; at least one reel rotatably disposed in said housing and having a circular series of raked teeth which define respective substantially radially directed surfaces facing in one of the directions of rotation of the reel; a supply of tape wound on said reel so as to be unwound from the latter upon rotation of the reel in said one direction and rewound on the reel upon rotation of the latter in the opposite direction; a one-piece molded-plastic braking member for each said reel including a support lever movable in said housing about a pivot means between an engaged position and a disengaged position, a pawl-like portion on a resilient extension of said support lever so as to be positioned against said raked teeth of the respective reel in said engaged position of the support lever and being spaced from said teeth in said disengaged position, said resilient extension permitting angular displacement of said pawl-like portion relative to said support lever so that, with the latter in said engaged position, rotation of said respective reel in said opposite direction for rewinding the tape thereon causes said raked teeth to move past said pawl-like portion as the latter is angularly displaced in one direction relative to the support lever to substantially free the reel for said rotation in said opposite direction thereof, whereas rotation of said respective reel in said one direction for unwinding the tape therefrom brings one of said surfaces of the raked teeth against said pawl-like portion so as to urge the latter to be angularly displaced in the opposite direction relative to said support lever, and spring means including one resilient arm integral at one end with said support lever and extending in a direction away from said support lever into engagement with said housing for yieldably urging said support lever to said engaged position thereof; another resilient arm extnding from said lever, said one resilient arm and said other resilient arm engage said housing at respective spaced apart locations both spaced from said pivot means for urging said lever to said engaged position; abutment means in said housing engageable by said pawl-like portion of the braking member in said engaged position of the support lever for blocking angular displacement of said pawl-like portion in said opposite direction relative to said support lever and thereby preventing unwinding of the tape from said reel; and said housing having an opening at which a portion of said support lever is accessible from the exterior of the housing for actuation of said support lever to said disengaged position against the force of said spring means.

* * * * *